US010830386B2

(12) United States Patent
Webb et al.

(10) Patent No.: US 10,830,386 B2
(45) Date of Patent: Nov. 10, 2020

(54) FIRE-RESISTANT PIPE COUPLING

(71) Applicant: Taylor Kerr (Couplings) Limited, Buckinghamshire (GB)

(72) Inventors: Ian Webb, Buckinghamshire (GB); Neil John Thornton Taylor, Buckinghamshire (GB)

(73) Assignee: Taylor Kerr (Couplings) Limited, Buckinghamshire (GB)

( * ) Notice: Subject to any disclaimer, the term of this patent is extended or adjusted under 35 U.S.C. 154(b) by 115 days.

(21) Appl. No.: 15/566,390

(22) PCT Filed: Mar. 30, 2016

(86) PCT No.: PCT/GB2016/050891
§ 371 (c)(1),
(2) Date: Oct. 13, 2017

(87) PCT Pub. No.: WO2016/166510
PCT Pub. Date: Oct. 20, 2016

(65) Prior Publication Data
US 2018/0135793 A1    May 17, 2018

(30) Foreign Application Priority Data
Apr. 14, 2015    (GB) .................................. 1506321.7

(51) Int. Cl.
*F16L 21/06*    (2006.01)
*F16L 59/18*    (2006.01)
(Continued)

(52) U.S. Cl.
CPC ........... *F16L 59/182* (2013.01); *F16L 21/005* (2013.01); *F16L 21/06* (2013.01); *F16L 27/1133* (2013.01)

(58) Field of Classification Search
CPC ....... F16L 59/182; F16L 21/06; F16L 21/005; F16L 27/1133; F16L 59/18; F16L 21/02; F16L 27/1136; F16L 33/04
See application file for complete search history.

(56) References Cited

U.S. PATENT DOCUMENTS 2,778,661 A * 1/1957 Leighton ................. F16L 23/10
                                                              24/279
2,883,211 A * 4/1959 Grass .................. F16L 27/1133
                                                              285/233
(Continued)

FOREIGN PATENT DOCUMENTS

EP    0542779 A1    5/1993
EP    0900346 B1    9/2002
(Continued)

OTHER PUBLICATIONS

International Search Report for Application No. PCT/GB2016/050891 dated Jun. 21, 2016.

*Primary Examiner* — David Bochna
*Assistant Examiner* — James A Linford
(74) *Attorney, Agent, or Firm* — Young Basile Hanlon & MacFarlane, P.C.

(57) ABSTRACT

The present invention relates to fire-resistant pipe couplings (100) for connecting together two plain-ended pipes in a fluid-tight manner. The pipe coupling (100) comprises: a tubular casing comprising: an outer tubular casing (102); and an inner tubular casing (104), fitting entirely inside the outer casing (102); a tubular sealing gasket (106) disposed within the inner tubular casing (104); and means (116) for tensioning the casing around the gasket (106). The casing further comprises: at least one layer of fire-resistant material (124) disposed between the inner (104) and outer (102) casings; and at least one layer of thermally-insulating material (128) disposed between the tubular sealing gasket (106)
(Continued)

and the inner casing (104), whereby the outer casing (102) and tubular sealing gasket (106) are thermally insulated from one another.

20 Claims, 7 Drawing Sheets

(51) Int. Cl.
  *F16L 21/00* (2006.01)
  *F16L 27/113* (2006.01)

(56) References Cited

U.S. PATENT DOCUMENTS

| | | | |
|---|---|---|---|
| 2,956,820 A * | 10/1960 | De Cenzo | F16L 19/028 |
| | | | 285/105 |
| 3,052,491 A * | 9/1962 | Grass | F16L 27/1133 |
| | | | 285/233 |
| 4,671,541 A | 6/1987 | Webb et al. | |
| 5,056,833 A | 10/1991 | Webb et al. | |
| 5,351,997 A | 10/1994 | Webb et al. | |
| 5,772,257 A | 6/1998 | Webb et al. | |
| 6,457,748 B1 | 10/2002 | Webb et al. | |
| 6,971,413 B2 | 12/2005 | Taylor et al. | |
| 7,396,053 B2 | 7/2008 | Webb et al. | |
| 7,490,866 B2 | 2/2009 | Webb et al. | |
| 8,430,432 B2 | 4/2013 | Webb et al. | |
| 9,611,957 B2 | 4/2017 | Webb et al. | |
| 2011/0025053 A1 | 2/2011 | Webb | |
| 2016/0195205 A1 | 7/2016 | Webb et al. | |
| 2016/0223104 A1 | 8/2016 | Webb et al. | |

FOREIGN PATENT DOCUMENTS

| | | |
|---|---|---|
| FR | 2926108 A1 | 7/2009 |
| GB | 1504006 A | 3/1978 |
| JP | 2009-138921 A | 6/2009 |

* cited by examiner

FIRE-RESISTANT PIPE COUPLING

The present invention relates to fire-resistant pipe couplings for connecting together two plain-ended pipes in a fluid-tight manner. In particular, the invention relates to pipe couplings of the type comprising a casing, a sealing gasket arranged within the casing, means for tightening the casing around the gasket to from a fluid tight seal between the two pipes.

Known pipe couplings of this type are described in our patent application EP-A-0542779 and EP-A-0900346.

Joining together pipes with plan ends with such couplings avoids the need for pipe preparation and is therefore quicker and more economical than other methods such as welding, screw threading, flanging, grooving or shouldering.

Couplings of the type described above are often required for use in systems where resistance to fire is required. For such applications the coupling may have to pass a specific fire test. Fire tests often require the coupling to perform when subjected to a flame temperature of, typically, 800 degrees C.±50 degrees C. and under a variety of simulated pipeline conditions. The test conditions depend on the testing authority and/or the intended field of application.

There are some fire tests, particularly for sprinkler systems, where the pipes must be empty for an initial period of time and thus the rubber is not cooled by the internal pipe medium. Higher marine standards have meant that the coupling has to withstand the flames for a longer time while empty than was previously required. The extended initial period of time may be 8 minutes, after which the pipes are flooded with water at 5 bar pressure for a further 22 minutes. The pipes and pipe coupling must then be capable of withstanding high pressure water, at say 32 bars, without failing.

This is generally reflective of a raising of standards in the shipping industry. It has been found that the higher standards are particularly onerous. The additional time that the coupling must withstand the flames while empty is such that the known fire-resistant couplings cannot prevent the gasket material, which is typically rubber or synthetic rubber, from reaching and exceeding the critical value of approximately 300 degrees C. where the material begins to melt, revert or decompose and thus fail.

One possibility would be to wrap the known fire-resistant coupling, after installation, with mineral wool and fire-shielding fabrics in order to reduce the temperature within the coupling to less than the critical value of approximately 300 degrees C. There are, however, severe drawbacks with this approach. The materials needed are extremely expensive; they have to be expertly prepared to a given formula ensuring a certain number of wraps and an exact thickness of material, to ensure the desired degree of protection; each size of coupling will require a different length of material, and in many cases materials will have to be pre-prepared to fit round the coupling rather than be cut in-situ. Consequently, this solution is feasible but impractical. Furthermore, in certain applications such as in marine installations, such additional insulation is not permitted, and all materials necessary to meet the fire-testing standard must be integral to the pipe coupling.

There is thus a requirement for a pipe coupling that can meet the higher fire performance requirements whilst retaining the advantages of the known gasketed mechanical coupling of time saving in installation, flexibility and ease of installation.

According to the present invention, there is provided a pipe coupling for coupling together two pipes in a fluid-tight manner. The pipe coupling comprises: a tubular casing comprising: an outer tubular casing; and an inner tubular casing, fitting entirely inside the outer casing; a tubular sealing gasket disposed within the inner tubular casing; and means for tensioning the casing around the gasket. The casing further comprises: at least one layer of fire-resistant material disposed between the inner and outer casings; and at least one layer of thermally-insulating material disposed between the tubular sealing gasket and the inner casing. The outer casing and tubular sealing gasket are thermally insulated from one another.

The coupling of the invention combines the advantages of the fire-shielding materials with a pipe coupling such that the coupling maybe supplied complete with its own fire-shield and thermal-shield, and be fitted in place without any further preparation. The difference between the present coupling and known fire-resistant couplings is so great that the present coupling can withstand the 800 degrees C.±50 degrees C. flames for at least 8 minutes while empty and then for a further 22 minutes at 5 bar internal pressure. After removal of the flames, the pipe coupling may then be capable of withstanding at least 32 bar internal pressure, and even 64 bar internal pressure. Known fire-resistant couplings would fail within 5 minutes. In addition, surprisingly it has been found that, for a given pipe diameter, the overall coupling size can be reduced. This is because the fire-shielding and thermal shielding are now separated, each shield being used for one task, rather than both as in known couplings. It has been found that the present coupling may be particularly advantageous for smaller pipe diameters, such as 38 mm which is typically the smallest pipe diameter used in this applications.

The or each layer of thermally-insulating material is made from mica. Mica has been found to be particularly advantageous since it has a relatively low thermal conductivity, and a relatively high continuous service temperature. Preferably, the thermally-insulating material is of a mica paper. The mica paper may comprise a phlogopite, or muscovite, mica, and a bonding material. Preferably, the mica paper comprises phlogopite and a bonding material. The mica paper may contain less than about 15% bonding material, preferably less than about 10% bonding material. The bonding material may be a silicon resin. The density of the mica paper may be between about 1.0 kg/m$^3$ to about 3 kg/m$^3$, preferably between about 1.5 kg/m$^3$ to about 2.5 kg/m$^3$. In one embodiment, the density of the mica paper is about 2.1 kg/m$^3$.

The thermal conductivity of the mica material may be less than 1 Watt per metre Kelvin (W/m·K), preferably less than 0.8 W/m·K. In one embodiment, the thermal conductivity of the mica paper is approximately 0.7 W/m·K. The continuous service temperature may be at least 500 degrees C., preferably at least 700 degrees C., and more preferably at least 1000 degrees C.

The or each layer of thermally-insulating material is preferably between about 0.2 mm and about 1.0 mm thick. More preferably, the or each layer of thermally-insulating material is between about 0.3 mm and about 0.6 mm thick.

The or each layer of thermally-insulating material is preferably a prepared strip of material cut to the outer circumference of the gasket. The prepared strip of thermally-insulating material may be cut with an overlap being about 1% to about 3% of the length of the strip. Preferably, the prepared strip of thermally-insulating material is cut with an overlap of about 1%. The additional material may also be advantageous to provide a tolerance.

Preferably, the pipe coupling comprises at least two layers of thermally-insulating material disposed between the tubular sealing gasket and the inner casing. By providing at least two layers of thermally-insulating material, the material may more easily conform to the shape and configuration of the casing while maintaining the required level of insulation. Each of the at least two layers may be formed from separate prepared strips of thermally-insulating material. Alternatively, the at least two layers may be formed from a single prepared strip of material cut to an integer multiple of the outer circumference of the gasket, the integer being equal to the number of required layers.

Where the pipe coupling comprises at least two layers of thermally-insulating material, each layer of thermally-insulating material is preferably between about 0.3 mm and about 0.6 mm thick. In one embodiment, the pipe coupling comprises two layers of thermally-insulating material, each layer being about 0.5 mm thick.

Where each thermally-insulating layer comprises a separate prepared strip of material, the layers are preferably arranged such that the free ends of a first layer are not coincident with the free ends of a second layer. The layers may be arranged such that the free ends of the first layer are substantially diametrically opposite the free ends of the second layer. Providing the layers in this way may yet further increase the thermal insulation by ensuring there are no gaps in the thermally-insulating layer. In addition, providing two layers in this way may enable the prepared strip of material to be cut to the outer circumference of the gasket without an overlap. The two layers may be cut to between about 1% and about 3% less than the outer circumference of the gasket. Such an arrangement may enable the coupling to be tightened more easily with a reduced risk of the material becoming gathered, rucked, creased or wrinkled as the casing tightens around the gasket and pipes.

Advantageously, the outer surface of the thermally-insulating material is preferably configured, such that, upon tightening the casing, the inner casing slides over the thermally-insulating material easily. Particularly advantageously, such an arrangement removes the requirement for lubrication during the installation process required by known pipe couplings of this type. In this way, the time saved during installation may be further increased, and the cost of installation may be reduced.

The thermally-insulating material is preferably substantially incompressible. Advantageously, providing thermally-insulating layers of material which are substantially incompressible may enable the pipe coupling to be tightened more securely, and may enable the pipe coupling to withstand higher internal fluid pressure during use. This is because the gasket does not expand under the fluid pressure as easily.

The inner casing and outer casing preferably each have a pair of annular flanges which project radially inwardly from their respective axial edges, the annular flanges of the inner casing being disposed axially inwardly of the annular flanges of the outer casing. The annular flanges are formed by bending inwardly the axial edges of the casing. The annular flanges may be substantially at right angles to the casing.

The or each layer of thermally-insulating material is preferably a prepared strip of flexible material having a width substantially equal to the width of the inner casing between the annular flanges of the inner casing. The width of the prepared strip of material may have a width between about 1% and about 3% of the width of the inner casing between the annular flanges of the inner casing to provide a tolerance.

Moving now to the at least one layer of fire-resistant material disposed between the inner casing and the outer casing. The or each layer of fire-resistant material is preferably made from inorganic materials. The inorganic materials include at least silica. The fire-resistant material is preferably formed from woven fibres of silica. The fire-resistant material may be impregnated with vermiculite. The fire-resistant material may be coated with polyurethane, preferably heat resistant polyurethane.

The or each layer of fire-insulating material may be between about 0.5 mm and about 1.5 mm thick. Preferably, the or each layer of thermally-insulating material is between about 0.8 mm and about 1.2 mm thick.

The or each layer of fire-resistant material is preferably a prepared strip of material cut to the outer circumference of the inner casing. The prepared strip of fire-resistant material may be cut with an overlap being about 1% to about 3% of the length of the strip. Preferably, the prepared strip of fire-resistant material is cut with an overlap of about 1%. The additional material may also be advantageous to provide a tolerance.

Preferably, the pipe coupling comprises at least two layers of fire-resistant material disposed between the inner casing and the outer casing. By providing at least two layers of fire-resistant material, the material may more easily conform to the shape and configuration of the casing while maintaining the required level of fire-protection. Each of the at least two layers may be formed from separate prepared strips of fire-resistant material. Alternatively, the at least two layers may be formed from a single prepared strip of material cut to an integer multiple of the outer circumference of the inner casing, the integer being equal to the number of required layers.

Where the pipe coupling comprises at least two layers of fire-resistant material, each layer of fire-resistant material is preferably between about 0.8 mm and about 1.2 mm thick. In one embodiment, the pipe coupling comprises two layers of fire-resistant material, each layer being about 1.0 mm thick.

Where each fire-resistant layer comprises a separate prepared strip of material, the layers are preferably arranged such that the free ends of a first layer are not coincident with the free ends of a second layer. The layers may be arranged such that the free ends of the first layer are substantially diametrically opposite the free ends of the second layer. Providing the layers in this way may yet further increase the fire-resistance by ensuring there are no gaps in the fire-resistant layer. In addition, providing two layers in this way may enable the prepared strip of material to be cut to the outer circumference of the inner casing without an overlap. The two layers may be cut to between about 1% and about 3% less than the outer circumference of the inner casing. Such an arrangement may enable the coupling to be tightened more easily with a reduced risk of the material becoming gathered, rucked, creased or wrinkled as the casing tightens around the gasket and pipes.

Advantageously, the outer surface of the fire-resistant material is preferably configured, such that, upon tightening the casing, the outer casing slides over the fire-resistant material easily. Particularly advantageously, such an arrangement removes the requirement for lubrication during the installation process required by known pipe couplings of this type. In this way, the time saved during installation may be further increased, and the cost of installation may be reduced.

The fire-resistant material is preferably substantially incompressible. Advantageously, providing fire-resistant layers of material which are substantially incompressible may enable the pipe coupling to be tightened more securely, and may enable the pipe coupling to withstand higher internal fluid pressure during use. This is because the gasket does not expand under the fluid pressure as easily.

Known pipe couplings typically have a fire-resistant and thermally-insulating layer of material having a thickness of at least 3 mm, and in most examples at least 5 mm. As will be appreciated from the foregoing description, the preferred embodiment of the present invention comprises layers of fire-resistant material and thermally-insulating materials which total up to 3 mm. Thus, advantageously, the present pipe coupling may have a smaller diameter than equivalent known fire-resistant pipe couplings while providing improved fire-resistance.

The or each layer of fire-resistant material is preferably a prepared strip of flexible material having a width greater than the width of the outer casing, such that the material extends radially inward at each annular flange to form a skirt. Advantageously, the skirt provides additional protection against the flames to the or each thermally-insulating layer, and more importantly to the gasket.

As used herein, the term "skirt" is used to define a piece of material which extends over or beyond something to afford protection.

Preferably, the skirt is configured to extend at least to the outer surface of the pipes being coupled together. The skirt may be further configured to extend longitudinally away from the casing along the outer surface of the pipes being coupled together. In this way, significant additional fire-protection may be provided by the or each fire-resistant layer.

Where the pipe coupling comprises at least two fire-resistant layers, only the outer layer may be provided with a skirt as described above. Alternatively, the inner layer may be provided with a skirt which extends substantially to the outer surface of the pipes being coupled together, and the outer layer may be provided with a skirt which is further configured to extend longitudinally away from the casing along the outer surface of the pipes being coupled together.

The pipe coupling may further comprise a thermally-insulating layer of material disposed between the fire-resistant layer of material and the outer casing. Alternatively, or in addition, the pipe coupling may further comprise a thermally-insulating layer of material disposed between the inner casing and the fire-resistant layer of material. The thermally-insulating layer of material is preferably of materials as described above.

Advantageously, such an arrangement yet further improves the insulation properties of the coupling and therefore reduces the temperature of the gasket, or enables the pipe coupling to withstand higher temperature flames.

Where the pipe coupling further comprises a thermally-insulating layer of material disposed between the fire-resistant layer of material and the outer casing, and or a thermally-insulating layer of material disposed between the inner casing and the fire-resistant layer of material, the width of the thermally-insulating layer of material is preferably substantially equal to the axial width of the inner casing. In this embodiment, the pipe coupling preferably only comprises one layer of fire-resistant material. Advantageously, it has been found that the overall dimensions of the pipe coupling may be reduced since the thickness of the thermally-insulating layer is preferably less than the thickness of a layer of fire-resistant material.

The inner casing and outer casing may have anti-rotation notches which interengage to prevent the casings rotating relative to one another. The anti-rotation notches may be provided in at least one of the annular flanges, where present, of the casings. Where the inner casing and the outer casing each comprise a longitudinal gap, the anti-rotation notches are preferably provided at a point diametrically opposite the longitudinal gaps.

The inner casing and outer casing may each have a longitudinal gap, the gaps of the inner casing and outer casing being aligned, and wherein the pipe coupling further comprises a bridging member extending across the gaps.

The bridge plate is preferably coupled to one of the first free end or the second free end of the inner casing. The bridge plate may be welded, bonded or soldered to one of the first free end or the second free end of the inner casing. Coupling the bridge plate to the inner casing enables the pipe coupling to be installed more easily.

The tubular inner casing and outer casing will typically each be formed of a strip of metal or other material formed into a tube with a gap extending longitudinally of the casing between the free ends of the strip, wherein the free ends of the strip are interconnected by the tensioning means. The bridge member will therefore typically be formed in a part-cylindrical shape with a radius of curvature similar to that of the casing. The casing on either side of the longitudinal gap overlaps with the bridge member. The bridge member may subtend an angle of between about 30 degrees and about 40 degrees at the pipe axis.

The outer circumferential surface of the inner casing is preferably straight-cylindrical, and the inner circumferential surface of the outer casing is preferably straight-cylindrical.

The pipe coupling preferably further comprises at least one gripping ring for gripping the pipe, the or each ring being disposed in a slot in the sealing gasket adjacent an axial end. Preferably, the pipe coupling comprises a pair of gripping rings disposed in slots in the sealing gasket adjacent each axial end.

The or each gripping ring may be an arcuate gripping ring having inwardly projecting gripping teeth, located in the tubular casing. Each gripping ring preferably forms a complete ring. In a preferred embodiment a plurality of arcuate segments are provided which overlap to form a complete ring. The or each arcuate gripping ring is preferably frusto-conical.

In the embodiment comprising at least one gripping ring, the ring is preferably formed in two segments. The segments comprise a major segment which subtends an arc of greater than 180° at the axis of the gripping ring and a minor segment which subtends an arc of less than 180° at the axis of the gripping ring. Where the casing is formed with a longitudinal gap, the tensioning means reduces the longitudinal gap when tightened. The minor segment is located adjacent the longitudinal gap and the major segment is located to the side of the casing remote from the longitudinal gap, the major and minor segments overlapping one another on either side of the gap.

The sealing gasket is preferably of rubber formed from a length of flat extrusion which is rolled into a tube and joined by welding, or gluing to form a complete cylinder.

Alternatively, the rubber gasket may be moulded. The outer surface of the gasket is preferably smooth but the inner surface is preferably formed with two sets of annular sealing ribs which project inwardly. Each set may comprise two, three, four, five or more ribs. In one embodiment there are three ribs in each set. Towards each end of the gasket the inner surface is preferably stepped inwardly to form lands.

The axial ends of the gasket are preferably formed by axial extensions of the inner part of the gasket, which form end seals.

The tensioning means are preferably provided on the outer casing. Any suitable tensioning means may be used. The tensioning means may be formed by folding the free ends of the outer casing back on themselves and welded to form a loop at each free end. A pin is inserted into each loop. At least one fastener, such as a screw, is passed through transverse holes in one of the pins into tapped transverse holes in the other of the pins, so as to interconnect the two free ends of the outer casing. Such a tensioning means is described in our patent specifications EP-A-0542779 and EP-A-0900346.

Alternatively, the tensioning system may comprise: a first tensioning member coupled to the first free end of the casing, comprising at least one engaging arm, and at least one engaging surface; a second tensioning member coupled to the second free end of the casing, comprising at least one engaging arm, and at least one engaging surface; and at least one fastener. The at least one engaging arm of the first tensioning member is configured to slidably engage with the at least one engaging surface of the second tensioning member. The at least one engaging arm of the second tensioning member is configured to slidably engage with the at least one engaging surface of the first tensioning member. Upon tightening the or each fastener, the first tensioning member and the second tensioning member are drawn together to tighten the outer casing, the engaging arms acting on the respective engaging surfaces to substantially prevent the first tensioning member from rotating relative to second tensioning member about the longitudinal axis of the tensioning members. Such a tensioning system is described in our patent specification GB 1504006.6.

The pipe coupling may be suitable for any pipe having an external diameter of between about 21 mm and about 450 mm. The pipe coupling of the present invention also accommodates typical pipe tolerances in accordance with, for example, BS EN 877:1999.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The disclosure extends to methods and apparatus substantially as herein described with reference to the accompanying drawings.

The invention will be further described, by way of example only, with reference to the accompanying drawings in which.

Figure 1:
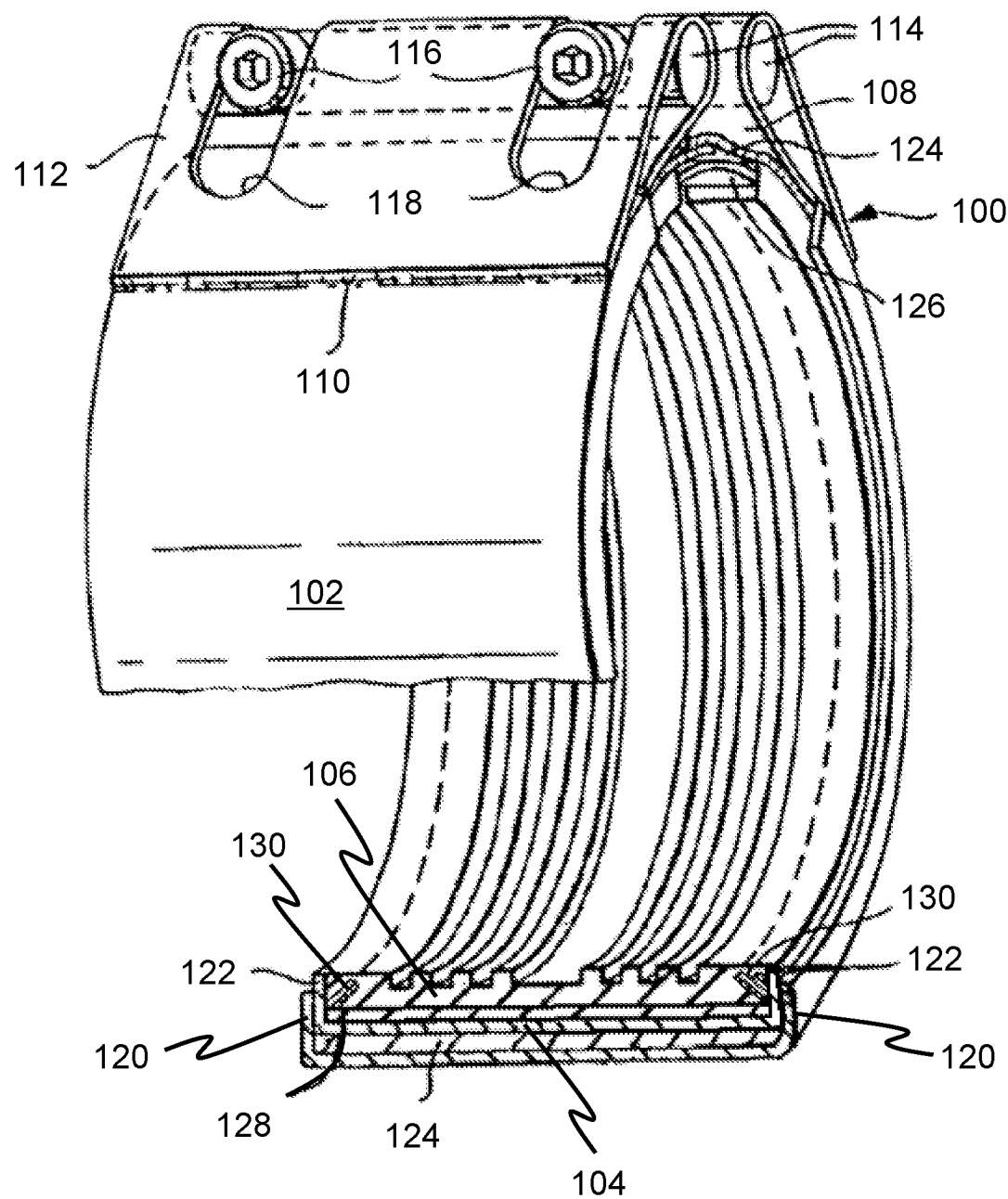
FIG. 1 shows a perspective cut-away of a pipe coupling according to the present invention.

A pipe coupling 100 which comprises an outer tubular casing 102, an inner tubular casing 104, and a tubular sealing gasket 106. The outer tubular casing 102 is formed of rolled steel, with a longitudinal gap 108. The casing is folded back on itself at its free ends and welded at 110 to form loops 112 along opposite edges of the longitudinal gap 108. Pins 114 are inserted in the loops. Tensioning screws 116 pass through transverse holes in one of the pins 114 into tapped transverse holes in the other of the pins 114, so as to interconnect the two free ends of the outer casing 102.

Slots 118 are cut in the loops 112 so as to provide clearance for the screws. The axial end margins of the casing 102 are bent inwardly at right angles to form annular flanges 120.

The inner tubular casing 104 is of rolled steel and has a longitudinal gap. The axial end margins of the inner casing 104 are bent inwardly at right angles to form annular flanges 122. The inner casing 104 fits inside the outer casing 102, the axial length of the inner casing 104 being slightly less than that of the outer casing 102 so that the flanges 122 fit inside the flanges 120.

The gasket is of an elastomeric material, for example rubber or synthetic rubber.

The outer casing 102 is formed having an internal diameter larger than the external diameter of the inner casing 104, so as to accommodate a fire-resistant layer of material 124. The fire-resistant layer of material is a prepared strip of material cut to the outer circumference of inner casing+1% for overlap and tolerance. The fire-resistant layer may comprise two or more layers of material. In a preferred example, the fire-resistant layer comprises two layers of material, each layer being about 1.0 mm thick. The outer steel casing 102 and inner steel casing 104 are insulated one from the other by the layer of fire-resistant material 124.

The shaping of the outer casing 102 and inner casing 104 are smooth and identical so that a low friction surface is offered to the fire-resistant material for easy sliding when closing the coupling.

This is important because a coupling which has only one casing will not provide low friction surfaces between the steel casing and the rubber gasket or sealing sleeve.

The longitudinal gaps of the outer casing 102 and the inner casing 104 are aligned and a bridge member 126 is provided to complete the circumferential band. This is in order to control the smooth sliding of the fire-resistant layer 124 when closing the coupling. The bridge member 126 is secured to the inner side of the inner casing 104 by spot welding.

The bridge member 126 subtends an angle of between about 30 degrees and about 40 degrees at the pipe axis. It is secured to the inner casing 104 on one side of the longitudinal gap only and is arranged to overlap the inner casing by approximately equal amounts on either side of the gap in the tightened position.

In addition to the fire-resistant layer 124, the coupling 100 comprises a thermally-insulating layer of material 128. The inner casing 102 is formed having an internal diameter larger than the external diameter of the gasket 106, so as to accommodate thermally-insulating layer of material 128. The thermally-insulating layer of material is a prepared strip of material cut to the outer circumference of gasket+1% for overlap and tolerance. The thermally-insulating layer may comprise two or more layers of material. In a preferred example, the thermally-insulating layer comprises two layers of material, each layer being about 0.5 mm thick. The inner steel casing 104 and the gasket 106 are insulated one from the other by the thermally-insulating material 128.

The coupling further comprises a pair of frusto-conical gripping rings 130. Each ring 130 is provided in a corresponding slot formed in the outer surface of the gasket at each axial end. The outer end of each slot lies at the axial end of the outer surface. The slope of the slot is such that the inner end is nearer the axial middle of the gasket than the outer end.

Each ring 130 is formed from a pair or arcuate segments, and comprises a set of hard teeth to penetrate through the gasket 106 at the bottom of the slot and bite into the surface of the pipe, thereby providing locking of the coupling to the pipe against axial movement. The teeth are designed to make contact at approximately 5 mm centres around the circumference with a width of approximately 2 mm for each tooth, giving approximately 40% contact around the periphery of the pipe.

Figure 2:
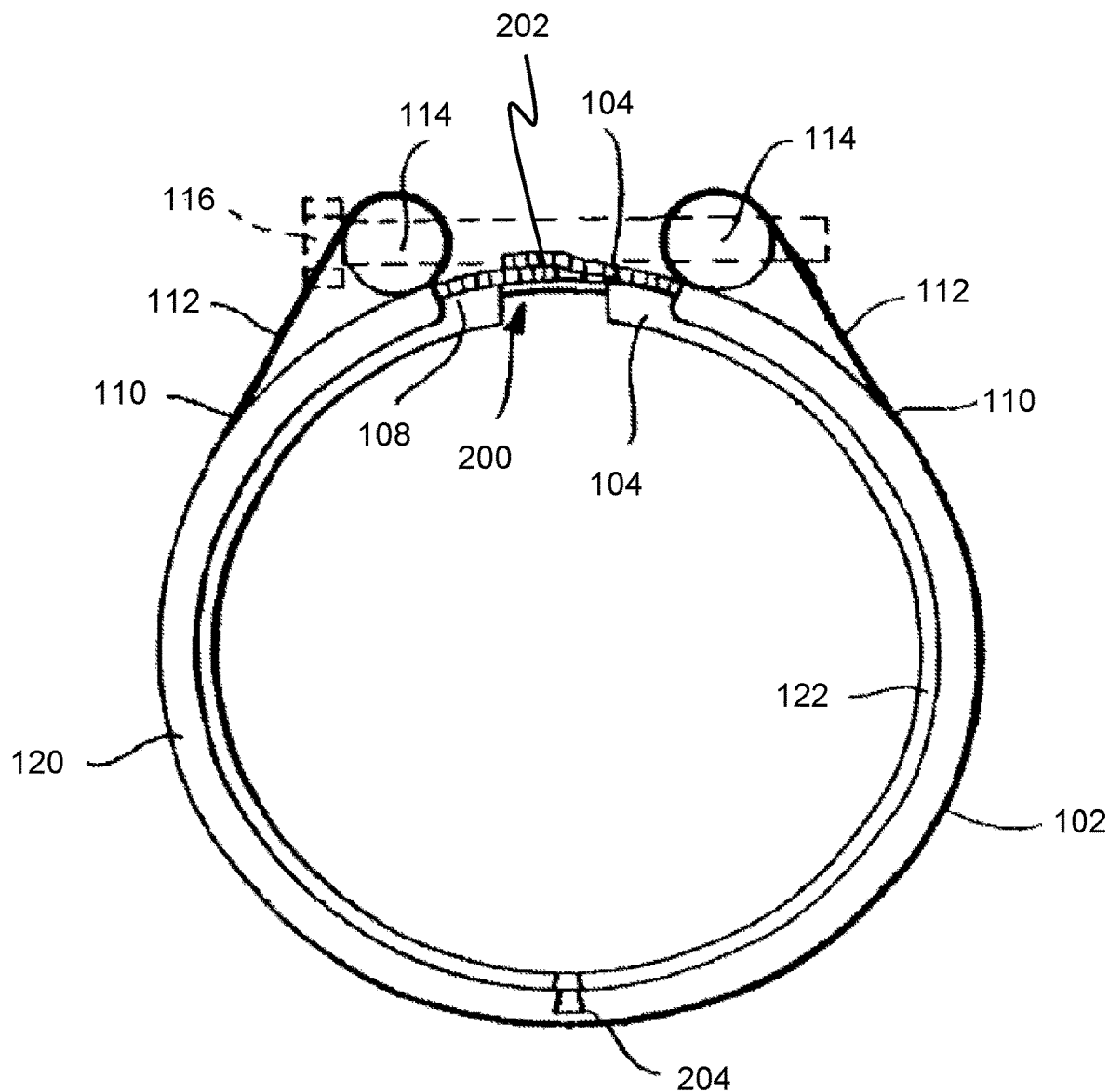
FIG. 2 shows an end view of the coupling of FIG. 1.

Referring now to FIG. 2, the longitudinal gap 200 in the inner casing 104 can be seen, along with the overlap 202 of the fire-resistant layer 124.

To prevent the two casings rotating relative to one another, anti-rotation notches 204 are provided in the end flanges 120 and 122 of the outer and inner casings which interengage at a point diametrically opposite the gaps 108 and 200 to lock the two casings together. It is important that the two casings do not rotate relative to one another.

The sealing gasket 106 comprises a series of ribs 300 to achieve a seal which is effective at high hydrostatic pressures, for example 32 bar or even 64 bar. However, the axial length of the gasket that is exposed to the hydrostatic pressure is small compared with the overall axial length of the coupling.

The fire-resistant layer 124 is made of inorganic materials, preferably predominantly silica. The material is formed from woven silica fibres, and may be impregnated with vermiculite. In addition, the material may be coated with high-temperature resistant polyurethane to reduce the potential for the woven material fraying, and to restrict the ingress of water into the coupling.

The fire-resistant material is formed in a rectangular strip which is wrapped around the inner casing. The ends of the strip overlap 202 in the region of the gaps 108 and 200.

The thermally-insulating layer 128 is made of mica. The material of this example is of a mica paper, and is particularly preferred. The mica paper comprises phlogopite and a bonding material. The mica paper contains about 10% bonding material, the bonding material being a silicon resin. The density of the mica paper in this example is about 2.1 kg/m$^3$.

During assembly, the complete integral inner casing, including the thermally-insulating layer and the gasket is placed within the outer casing, between which a fire-resistant layer is inserted to insulate the two. It can therefore be seen that the outer casing 102 is insulated from the inner casing 104 by the fire-resistant layer 124, and that the gasket 106 is thermally-insulated from the inner casing 104 by the thermally-insulating layer 128.

Figure 3:
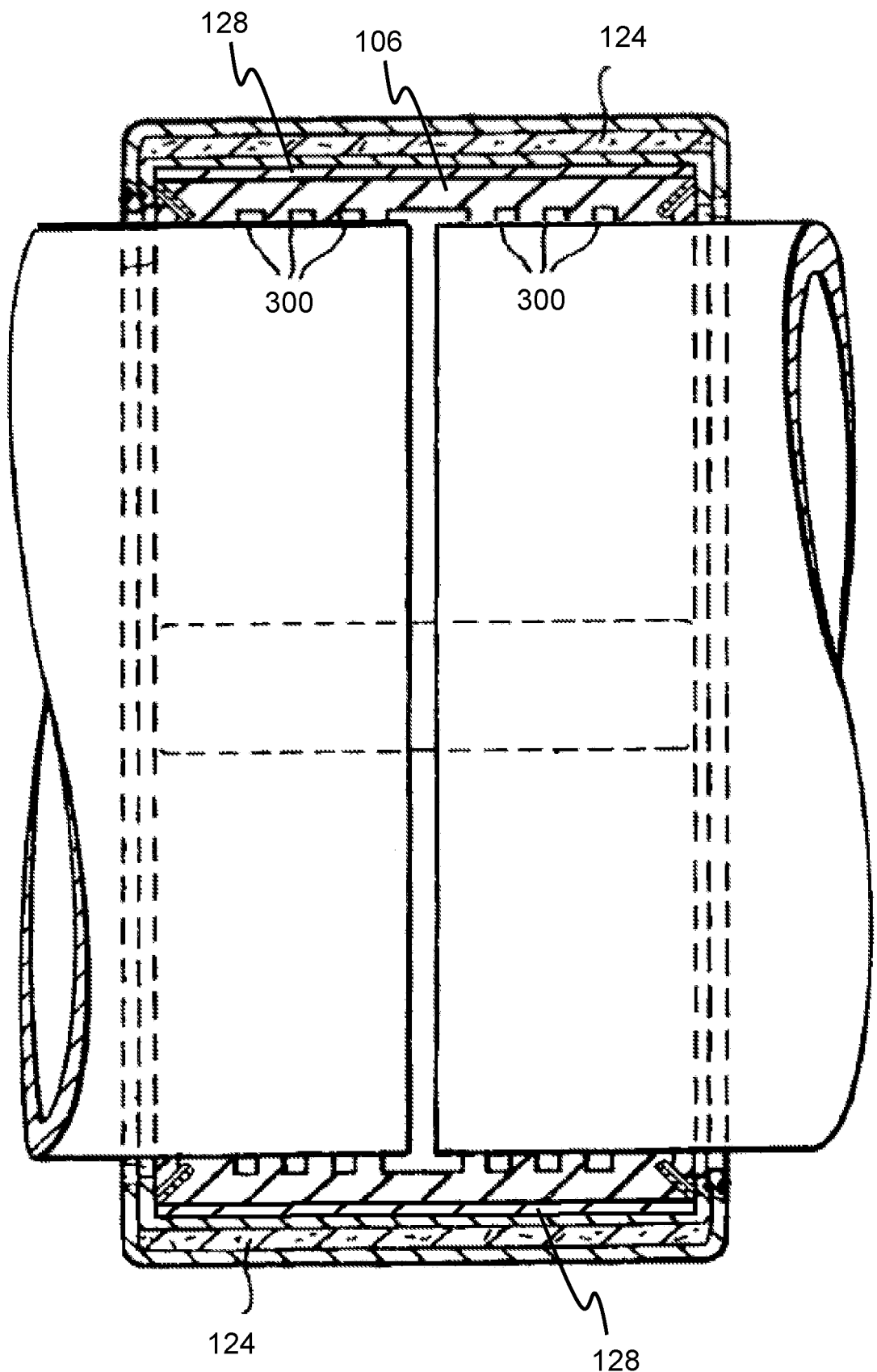
FIG. 3 shows a longitudinal section through the coupling of FIG. 1.
Figure 4:
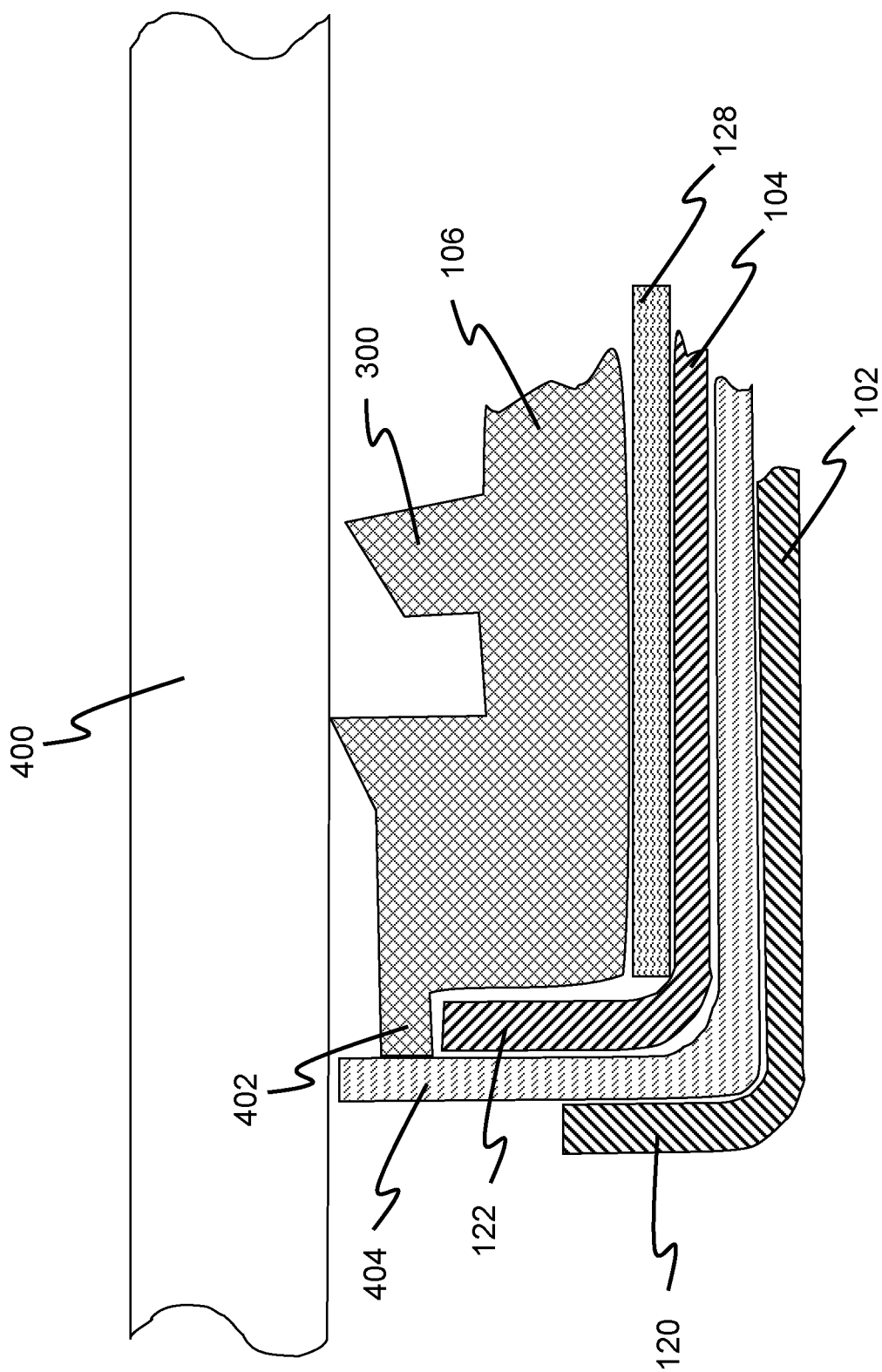
FIG. 4 shows a detailed cross-sectional view of a modified coupling of FIG. 1.

FIG. 4, shows a modified example of the pipe coupling of FIGS. 1 to 3. The pipe coupling 100 is shown in a pre-tightened arrangement on pipe 400. The gasket 106 comprising the ribs 300, is shown to further comprise the extensions 402 which lie between the end face of the annular flange 122 and the outer surface of the pipe 400 to form end seals. Thus liquid and dirt is prevented from entering the coupling from outside.

The inner casing 104, in this example, has a width less than the internal width of the outer casing 102 between the flanges 120. The reduction in width of the inner casing 102 as compared to the example of FIGS. 1 to 3 is to accommodate a skirt 404 of the fire-resistant layer 124. The skirt extends between the outer casing 102 and the inner casing 104. The skirt has sufficient length that it at least reaches the outer surface of the pipe 400. In other examples (shown in FIG. 7) the skirt may have a length such that it extends away from the coupling and along a portion of the outer surface of the pipe 400.

By providing a skirt, the external end faces of the coupling, which include a portion of the gasket and the annular flanges 122, are further protected from the flames.

The coupling of FIG. 4 is the same as described above in all other respects.

Figure 5:
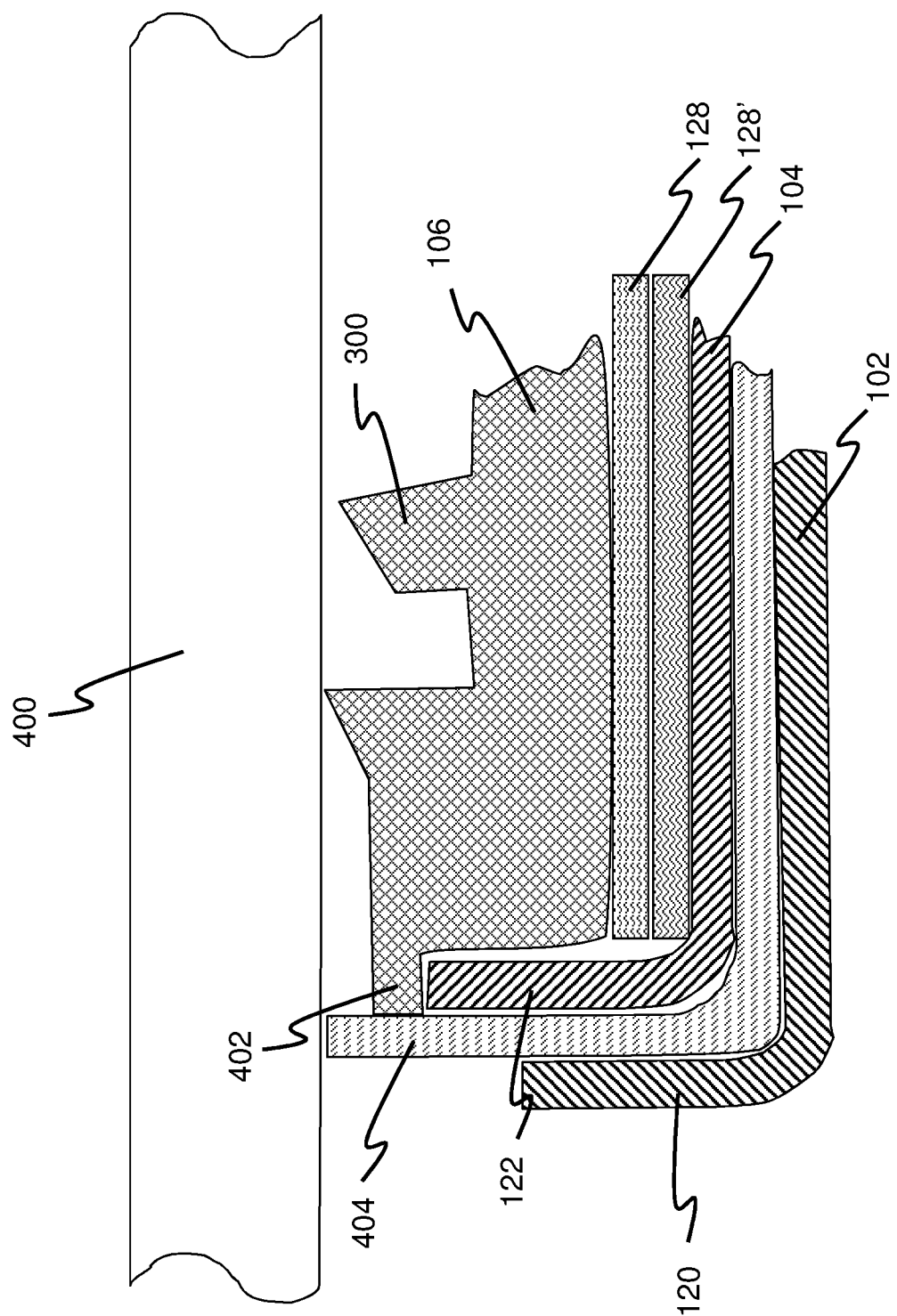
FIG. 5 shows a cross-sectional view of the coupling including two layers of thermally-insulating material.

FIG. 5 shows a cross-sectional view of an alternative embodiment of the pipe coupling relative to a pipe 400. The pipe coupling of FIG. 5 is similar to that shown in FIG. 4, and described above, except that it includes first layer of thermally-insulating material 128 and a second layer of thermally-insulating material 128'.

Figure 6:
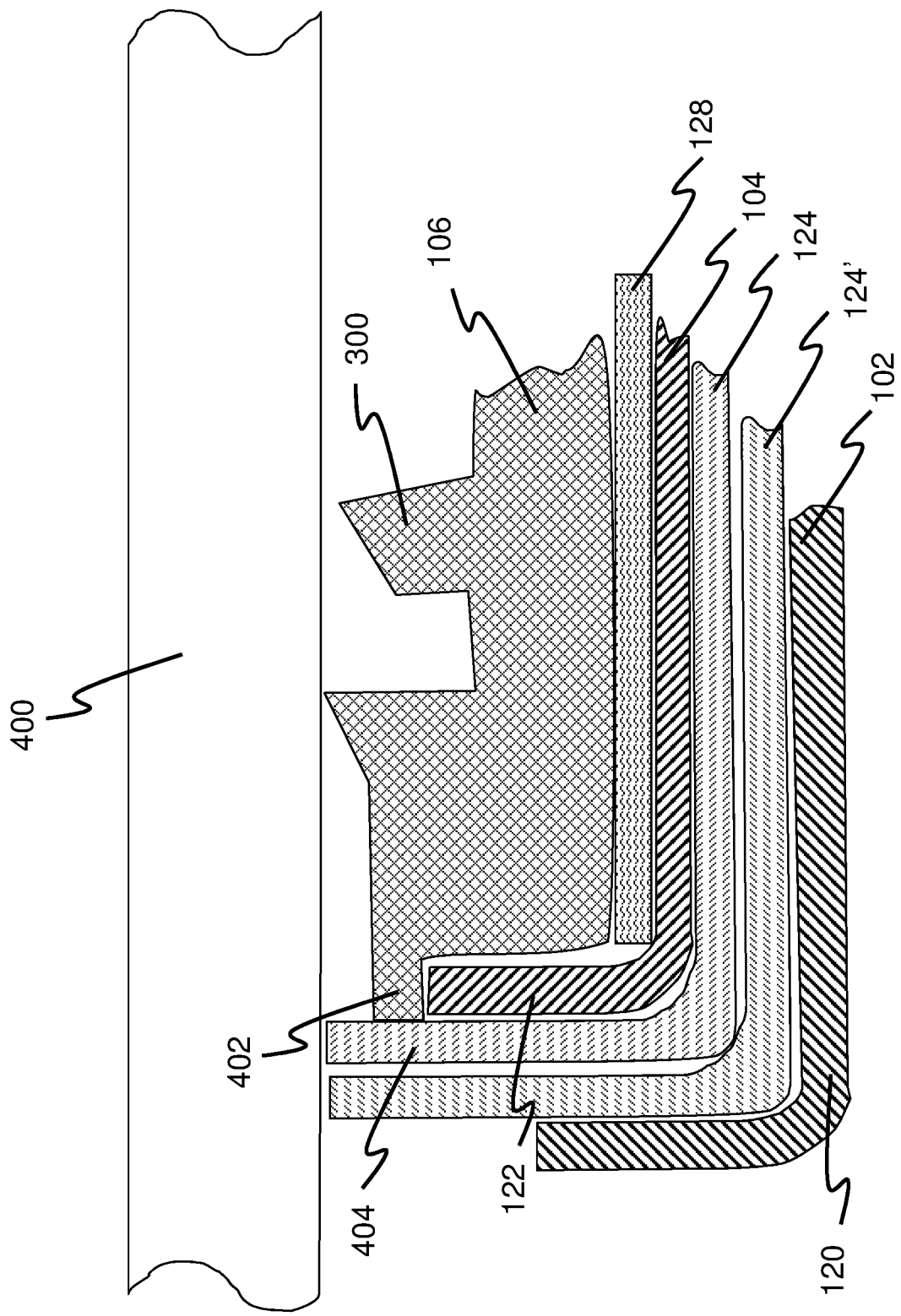
FIG. 6 shows a cross-sectional view of the coupling including two layers of fire-resistant material.

FIG. 6 shows a cross-sectional view of a further alternative embodiment of a pipe coupling relative to a pipe 400. Again, the pipe coupling of FIG. 6 is similar to that shown in FIG. 4, and described above, except that it includes a first layer of fire-resistant material 124 and a second layer fire-resistant material 124'. The first layer of fire-resistant material 124 and the second fire-resistant material 124', including the skirts 404, have a width that is greater than a width of the outer casing 102 and the first layer fire-resistant material 124 and the second layer fire-resistant material 124' extend to an outer surface of the pipe 400.

Figure 7:
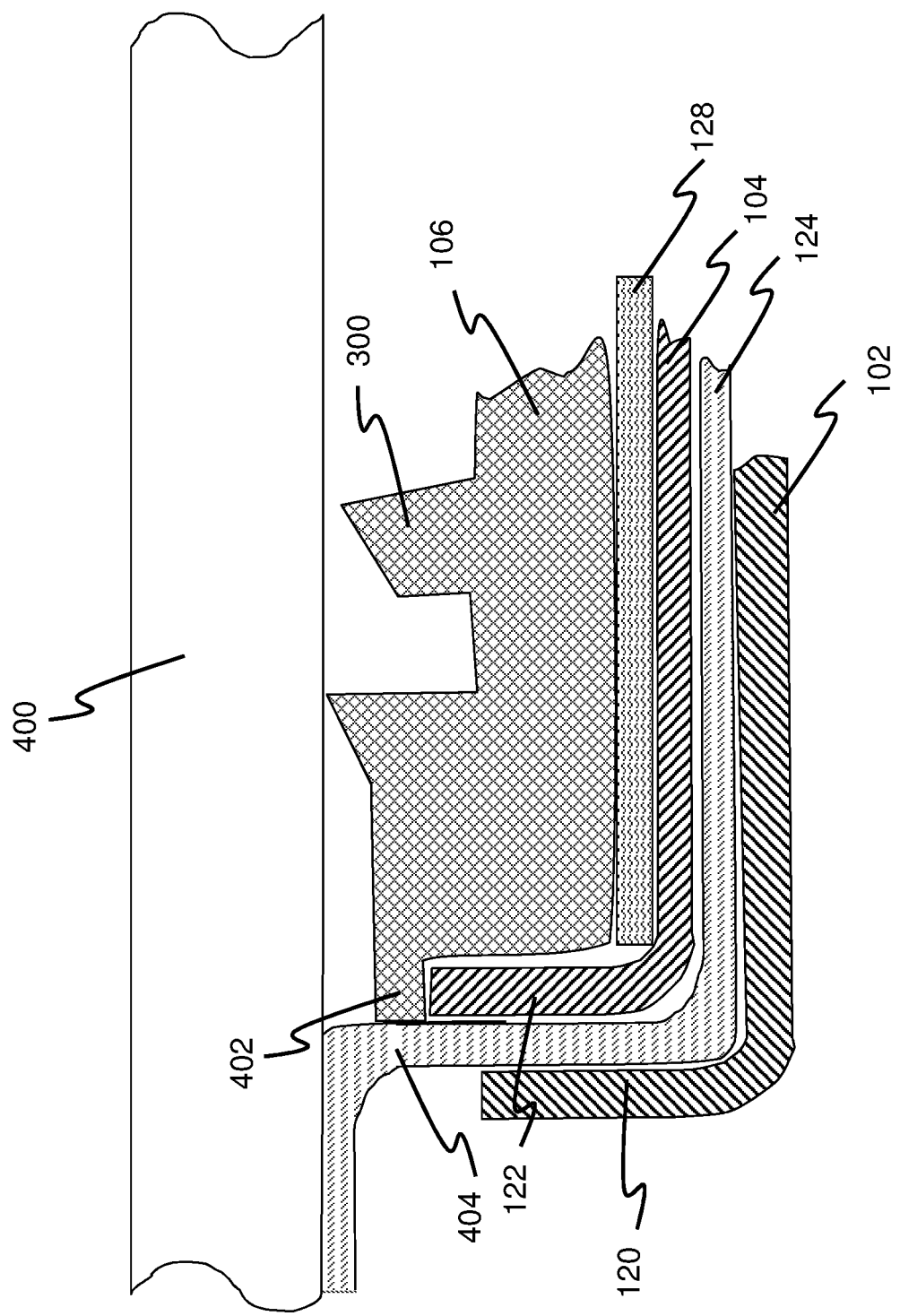
FIG. 7 shows a cross-sectional view of the coupling with a skirt that extends longitudinally away from the casing along the outer surface of the pipes.

FIG. 7 shows a cross-sectional view of a yet further alternative embodiment of a pipe coupling relative to a pipe 400. Again, the pipe coupling of FIG. 7 is similar to that shown in FIG. 4, and described above, except that the skirt 404 has a length such that it extends longitudinally away from the coupling and along a portion of the outer surface of the pipe 400. As will be appreciated, a further skirt 404 is formed at the opposite end of the pipe coupling which extends longitudinally away from the pipe coupling in the opposite direction to the skirt show in FIG. 7.

The invention claimed is:

1. A pipe coupling for coupling together two pipes in a fluid-tight manner, comprising:
   a tubular casing comprising: an outer tubular casing; and an inner tubular casing, fitting entirely inside the outer tubular casing;
   a tubular sealing gasket disposed within the inner tubular casing; and
   means for tensioning the tubular casing around the gasket, wherein: the tubular casing further comprises:
       at least one layer of fire-resistant material disposed between the inner tubular casing and the outer tubular casings, wherein the at least one layer of fire-resistant material or each layer of fire resistant material is a prepared strip of flexible material having a width greater than the width of the outer tubular casing, such that the prepared strip of flexible material or each of the prepared strips of flexible material extend radially inward at each end to form a skirt at each end, so that the prepared strip of flexible material or each prepared strip of flexible material has a pair of skirts, and the pair of skirts of the prepared strip of flexible material or each pair of skirts of each prepared strip of flexible material is configured to extend toward an outer surface of one of the pipes being coupled together; and at least one layer of thermally-insulating material disposed between the tubular sealing gasket and the inner tubular casing, whereby the outer tubular casing and tubular sealing gasket are thermally insulated from one another.

2. A pipe coupling according to claim 1, wherein the at least one layer of thermally-insulating material is at least two layers of thermally-insulating material disposed between the tubular sealing gasket and the inner tubular casing.

3. A pipe coupling according to claim 1, wherein the at least one layer of thermally-insulating material is made from mica.

4. A pipe coupling according to claim 1, wherein the at least one layer of thermally-insulating material is between about 0.3 mm and about 1.0 mm thick.

5. A pipe coupling according to claim 1, wherein the at least one layer of fire-resistant material is at least two layers of fire-resistant material disposed between the inner tubular casing and the outer tubular casings.

6. A pipe coupling according to claim 1, wherein the at least one layer of fire-resistant material is made from inorganic materials.

7. A pipe coupling according to claim 6, wherein the inorganic materials include at least silica.

8. A pipe coupling according to claim 6, wherein the at least one layer of fire-resistant material is impregnated with vermiculite.

9. A pipe coupling according to claim 1, wherein the at least one layer of fire-insulating material is between about 0.5 mm and about 1.5 mm thick.

10. A pipe coupling according to claim 1, wherein the inner tubular casing and the outer tubular casing each have a pair of annular flanges which project radially inwardly from their respective axial edges, the pair of annular flanges of the inner tubular casing being disposed axially inwardly of the pair of annular flanges of the outer tubular casing.

11. A pipe coupling according to claim 10, wherein the at least one layer of thermally-insulating material is a prepared strip of flexible material having a width substantially equal to the width of the inner tubular casing between the pair of annular flanges of the inner tubular casing.

12. A pipe coupling according to claim 1, wherein the pair of skirts, or each pair of skirts is further configured to extend longitudinally away from a respective side of the tubular casing along the outer surface of a respective one of the two pipes being coupled together.

13. A pipe coupling according to claim 1, wherein the at least one layer of thermally-insulating material is configured such that, when the tubular coupling is tightened, the inner tubular casing slides over the at least one layer of thermally-insulating material.

14. A pipe coupling according to claim 1, wherein the at least one layer of fire-resistant material is configured such that, when the tubular coupling is tightened, the outer tubular casing slides over the at least one layer of fire-resistant material.

15. A pipe coupling according to claim 1, wherein the at least one layer, or each layer of fire-resistant material is a prepared strip of material having a length that is a length of an outer circumference of the inner tubular casing.

16. A pipe coupling according to claim 15, wherein the length of the prepared strip, or each prepared strip, of fire-resistant material has an overlap being about 1% to about 3% of the length of the strip.

17. A pipe coupling according to claim 1, wherein the at least one layer of thermally-insulating material or each layer of thermally-insulating material is a prepared strip of material having a length that is cut to a length of an outer circumference of the gasket.

18. A pipe coupling according to claim 17, wherein the prepared strip of thermally-insulating material or each prepared strip of thermally-insulating material has a length with an overlap being about 1% to about 3% of the length of the strip.

19. The pipe coupling according to claim 1, wherein the pair of skirts are free of contact with each of the two pipes respectively when the pipe coupling is in a pre-tightened arrangement.

20. The pipe coupling according to claim 1, wherein the tubular sealing gasket includes extensions that lie between an end face of an annular flange of the inner casing and the outer surface of at least one of the two pipes.

* * * * *